United States Patent
Schiefer et al.

(10) Patent No.: US 9,009,732 B2
(45) Date of Patent: Apr. 14, 2015

(54) METHOD OF PROCESSING A SOURCE SET OF RAW EVENTS TO A TARGET SET OF TYPED EVENTS

(75) Inventors: Josef Schiefer, Vienna (AT); Gerd Saurer, Pinkafeld (AT); Szabolcs Rozsnyai, Vienna (AT); Heinz Roth, Lochau (AT); Martin Suntinger, Vienna (AT)

(73) Assignee: Automic Software, GmbH, Wolfsgraben (AT)

( * ) Notice: Subject to any disclaimer, the term of this patent is extended or adjusted under 35 U.S.C. 154(b) by 1211 days.

(21) Appl. No.: 12/107,399

(22) Filed: Apr. 22, 2008

(65) Prior Publication Data

US 2009/0265379 A1    Oct. 22, 2009

(51) Int. Cl.
*G06F 17/30* (2006.01)

(52) U.S. Cl.
CPC ................... *G06F 17/30507* (2013.01)

(58) Field of Classification Search
None
See application file for complete search history.

(56) References Cited

U.S. PATENT DOCUMENTS

| | | | |
|---|---|---|---|
| 6,941,560 B1 * | 9/2005 | Lowry et al. | 719/328 |
| 7,716,676 B2 * | 5/2010 | Sawicki et al. | 719/313 |
| 7,788,722 B1 * | 8/2010 | Njemanze et al. | 726/23 |
| 2002/0056004 A1 * | 5/2002 | Smith et al. | 709/227 |
| 2004/0123304 A1 * | 6/2004 | Black et al. | 719/318 |
| 2006/0184410 A1 * | 8/2006 | Ramamurthy et al. | 705/8 |
| 2007/0271573 A1 * | 11/2007 | Chandrasekaran | 719/318 |
| 2007/0288419 A1 * | 12/2007 | Strassner | 706/55 |

OTHER PUBLICATIONS

Fiege, L.; "Visibility in Event-Based Systems"; Dissertation; Darmstadt 2005, Darmstadter Dissertationen D17; 233 pages.
Moen, P.; "Attribute, Event Sequence, and Event Type Similarity Notions for Data Mining"; Department of Computer Science, Series of Publications A, Report A-2000-1; 209 pages.
http://www.rulecore.com; "Welcome to ruleCore"; Copyright MS Analog Software kb. 2002-2008.
Pietzuch et al.; "Hermes: A Distributed Event-Based Middleware Architecture"; 8 pages.
Zdonik et al.; "The Aurora and Medusa Projects"; Bulletin of the IEEE Computer Society Technical Committee on Data Engineering; pp. 1-8.
Seirio et al.; "Design and Implementation of an ECA Rule Markup Language"; 15 pages.
Schiefer et al.; "Management and Controlling of Time-Sensitive Business Processes with Sense & Respond"; 6 pages.
Schiefer et al.; "Correlating Events for Monitoring Business Processes"; 8 pages.

(Continued)

*Primary Examiner* — H S Sough
*Assistant Examiner* — Umut Onat
(74) *Attorney, Agent, or Firm* — Hoffmann & Baron, LLP

(57) ABSTRACT

A method of processing raw events to typed events, each raw event including data items containing data values, the method includes: providing a library of event type objects, each event type object relating to a given event type and including attributes of given data types, the attributes in each event type object structured according to a given structure; for each raw event, determining an event type object in the library which meets: (i) each of the data items in the raw event maps to an attribute in the event type object, and (ii) a data value in each of the data items is of a data type detected to match the given data type of the mapped attribute; and generating a typed event from each raw event, the typed event including the data values of the raw event structured according to the structure of the determined event type object.

20 Claims, 3 Drawing Sheets

(56) References Cited

OTHER PUBLICATIONS

Pedersen, Claus H.; "Extending Ordinary Inheritance Schemes to Include Generalization"; OOPSLA '89 Proceedings' Oct. 1-6, 1989; pp. 407-417.

Tanenbaum et al.; "Distributed Systems Principles and Paraadigms"; Copyright 2002 by Prentice-Hall, Inc.; Sec. 2.4; 9 pages.

Sakkinen, M.; "Exheritance—Class Generalisation Revived"; Information Technology Research Institute, University of Jyvaskyla; pp. 1-6.

Mannila et al.; "Similarity between Event Types in Sequences"; Mukesh Mohania and A Min Tjor (Eds.): DaWaK '99 LNCS 1676, pp. 271-280, 1997; Copyright Springer-Verlag Berline Heidelberg 1999.

Luckham, D.; "The Power of Events an Introduction to Complex Event Processing in Distributed Enterprise Systems"; 5 pages (preface).

Carney et al.; "Monitoring Streams—A New Class of Data Management Applications"; Proceedings of the 28th VLDB Conference, Hong Kong, China, 2002; 12 pages.

Banavar et al.; "Information Flow Based Event Distribution Middleware"; 8 pages.

Abadi et al.; "Aurora: a new model and architecture for data stream management"; The VLDB Journal (2003) / Digital Object Identifier (DOI) 10.1007/s00788-003-0095-z; pp. 1-20.

Adi et al.; "Amit—The Situation Manager"; IBM Research Laboratory in Haifa; pp. 1-65.

Abadi et al.; "The Design of the Borealis Stream Processing Engine"; Proceedings of the 2005 CIDR Conference; 13 pages.

Chen et al.; "Complex Event Processing using Simple Rule-based Event Correlation Engines for Business Performance Management"; Proceedings of the 8th IEEE International Conference on E-Commerce Technology and the 3rd IEEE International Conference on Enterprise Computing, E-Commerce, and E-Services (CEC/EEE '06); 8 pages.

Carzaniga et al.; "Design and Evaluation of a Wide-Area Event Notification Service"; ACM transactions on Computer Systems, vol. 19, No. 3, Aug. 2001, pp. 332-383.

EsperTech; Event Stream Intelligence: Esper & NEsper; "Where Complex Event Processing meets Open Source"; pp. 1-3; Last Published: Jun. 3, 2008, Version: 2.1.0.

Fulton, H.; "The Ruby Way, Second Edition"; Addison-Wesley Professional Ruby Series; 9 pages, Chapter 1, pp. 1-6.

Eugster et al.; "Content-Based Publish/Subscribe with Structural Reflection"; Communication,Systems Department Swiss Federal Institute of Technology, Lausanne; 16 pages.

Eugster et al.; "Type-Based Publish/Subscribe"; 22 pages.

Aguilera et al.; "Matching Events in a Content-based Subscription System"; 9 pages.

Lamport, L., Massachusetts Computer Associates, Inc.; "Time, Clocks, and the Ordering of Events in a Distributed System"; Communications of the ACM; Jul. 2978, vol. 21, No. 7; pp. 558-565.

\* cited by examiner

METHOD OF PROCESSING A SOURCE SET OF RAW EVENTS TO A TARGET SET OF TYPED EVENTS

FIELD OF THE INVENTION

The present invention relates to a method of processing a source set of raw events of unknown event types to a target set of typed events, each raw event being a package of data items containing data values of detectable data types.

TECHNOLOGICAL BACKGROUND

Event-based systems are increasingly gaining widespread attention for applications that require integration with loosely coupled and distributed systems for time-critical business solutions. An event is a record of an activity in a system. The event signifies the activity. An event may be related to other events. For purposes of maintaining information about an activity, events also capture attributes about the context when the event occurred. Event attributes are items such as the agents, resources, and data associated with an event, the tangible result of an activity (e.g., the result of an approval decision), or any other information that gives character to the specific occurrence of that type of event. Elements of an event context can be used to define a relationship with other events in order to correlate them.

Traditionally, event-based systems use publish-subscribe paradigms as well as stream processing, continuous queries, and event correlation. Event-based systems may also employ various ways of representing, filtering and querying events. In many cases, event models have grown from query languages, distributed platforms or architectures for integrating systems.

Event-based systems require structural information (meta-data) on the events they process. Therefore, event-based systems use "event types" for classifying event objects. To this end, within event-based systems events should be instances of an event type and have the structure defined by their type. The structure is represented as a collection of event attributes. An event attribute is a component of the structure of an event. An attribute can have a simple or complex data type.

However, in distributed systems the type of an event received by an event-processing entity is often unknown at runtime if unstructured, i.e. "raw" events are received.

Accordingly, there is a need in event processing systems to gain structural information of unstructured raw events in order to allow fast implementations of event-driven applications.

SUMMARY OF INVENTION

It is an object of the invention to fulfill these and other needs, to overcome problems associated with the prior art, and to propose a method for automatically inferring structural information from event data received in event processing systems.

To this end, the invention provides a method of processing a source set of raw events of unknown event types to a target set of typed events, each raw event being a package of data items containing data values of detectable data types, comprising the steps of:
(a) providing a library of event type objects each of which relates to a given event type and contains a structured set of attributes of given data types;
(b) for each raw event, determining at least one event type object in the library which meets the following criteria:
  the data items of the raw event can each be mapped to one of the attributes of the event type object, and
  the detected data types of the raw event each match the given data type of the respective attribute mapped; and
(c) generating a typed event from the raw event by structuring the data values of the raw event in the form of the event type object determined.

The present invention provides for an automatic structuring of events for the purpose of integrating and processing event data in event-based systems. The claimed solution has the following benefits:
  Automatic Data Mapping: The method of the invention allows to automatically map external and internal data to predefined and known event types without defining mappings between the source and target data. The method automatically finds the appropriate event types for the source data and automatically performs the data mapping.
  Fast Integration of External Systems: When an event-based system incorporating the method of the invention receives event data, it automatically finds the fitting event types for the received data. The integration effort is minimized since a user does not have to define any mapping information so that the event-based system can correctly interpret and process the event data.
  Dynamic Data Binding: The inventive method determines during runtime which event types are appropriate for a set of data. This has the following major advantages: (i) event types can be changed in the runtime system, (ii) a system can change during the runtime the types of events, and (iii) a system can perform the data binding only when it is actually required or needed.

It should be noted that the method of the invention makes use of so-called "duck typing" concepts ("if it walks like a duck and quacks like a duck, it must be a duck", conf. Fulton, Hal, "The Ruby Way, Second Edition: Solutions and Techniques in Ruby Programming", Addison-Wesley, Professional Ruby Series, 2006) known from the field of object-oriented software engineering. In software engineering duck typing considers the methods to which a value responds and the attributes it possesses rather than its relationship to a type hierarchy.

By applying the concepts of duck typing for the first time to the field of event processing, developers of event-driven applications do not have to map event data from source systems for processing those data with an event-based system. This leaves the developer with the simplified task of developing the processing logic for events. The method of the invention facilitates significantly the integration of event data from external systems, regardless of their technical scope of application, and enables dynamic binding of event data to data structures, i.e. event types. Thereby the method makes it easy to make changes to event-driven applications during runtime.

Further objects, features and benefits of the invention will become apparent from the appended claims and the following detailed description of its preferred embodiments under reference to the enclosed drawings, wherein:

DETAILED DESCRIPTION OF THE PREFERRED EMBODIMENTS

Figure 1:
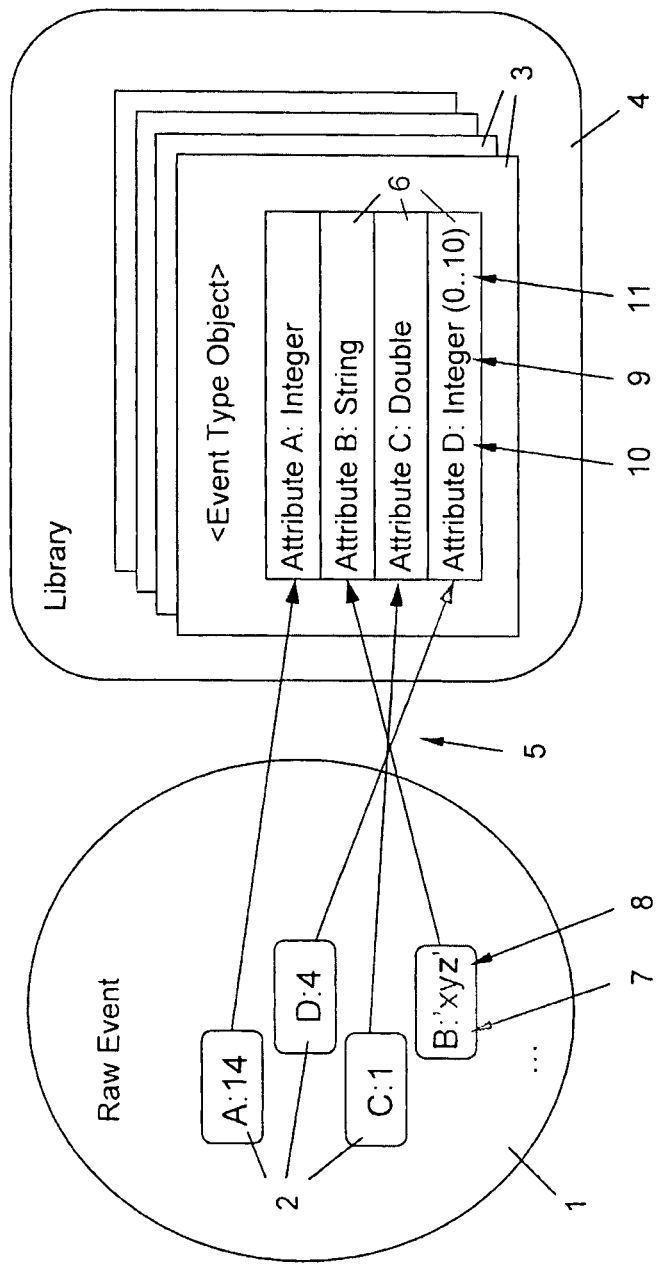
FIG. 1 shows an example of mapping the data items of a raw event to the attributes of an event type object for determining a "fitting" event type object from the library.

The method of the invention relies on the use of duck typing for the purpose of event processing. Here, duck typing leads to a strategy of applying runtime coercions to make values fit into event types required for processing tasks of an event-based system. Duck typing, as proposed herein, includes loosely typing events so that two such types are deemed equal if they contain the same set of attributes and the attributes are of coercible data types.

When an event-based system is receiving event data from an external system the events can be present in various formats including XML, hash tables or text formats. Any set or stream of source event data is called in the following a "source set" of "raw events". The present method allows to map a source set of raw events to a "target set" of "typed events" by using a library of predefined event type objects in order to process the raw events. Thereby, the system automatically determines which event types fit for the source data received. In other words, the method looks for event types which are compatible to the source data and processes the source data corresponding to the applicable event type object determined.

To this end, the present method relies on a library of predefined and known event type objects each of which relates to a given event type and contains a structured set of attributes of given data types. By using the concept of duck typing the method is able to derive, or infer, respectively, the event type of a raw event by determining a fitting event type object and subsequently to interpret the raw event according to the structure of the event type object determined. Thus, a "typed event" is generated which contains all the data values of the raw event, now structured in the correct way according to the event type of the raw event.

In a first step of the method the library of event type objects is provided each of which relates to a given event type and contains a structured set of attributes of given data types.

Then, for each raw event at least one event type object is determined from the library which meets the following criteria:
1) all data items of a raw event can each be mapped to one of the attributes of an event type object, and
2) the detected data types of the raw event each match the given data type of the respective attribute mapped.

Finally, for each raw event a typed event is generated from the raw event by structuring the data values of the raw event in the form of the event type object determined.

Additional criteria may be used for an event type object to be determined as "fitting" for a raw event:
3) (optional) mandatory attributes of an event type object must have been mapped by data items of the raw event; and/or
4) (optional) data value constraints of an event type object must be met by the respective data values of the raw event; and/or
5) (optional) data names of the data values of the raw event must match certain (optional) attribute names of the mapped attributes of the event type object.

FIG. 1 shows an example of the mapping step of a raw event 1, which is package of data items 2, to a "fitting" event type object of a library 4 of predefined event type objects 3. In the mapping step 5 the data items 2 are mapped to attributes 6 of the event type object 3. Each data item 2 is a pair of a data name 7 ("A", "B", "C", "D") and a data value 8 ("14", "4", "1", "XYZ") the data type of which is detectable, e.g. explicitly indicated or implicitly derivable such as "integer", "string" et cet. The mapping 5 is only performed when the data types of the data values 8 match, i.e. coincide or are at least compatible with, given data types 9 ("integer", "string", "double") of the attributes 6 of the event type object 3 considered.

Furthermore, in the present example the attribute 6 with the attribute name 10 "D" has a data value constraint 11 requesting that only data values 8 from zero to ten are allowed. During the mapping step 5 event type object 3 is only determined as fitting if the data item 2 mapped to the respective attribute 6 has a data value 8 between zero and ten.

Figure 2:
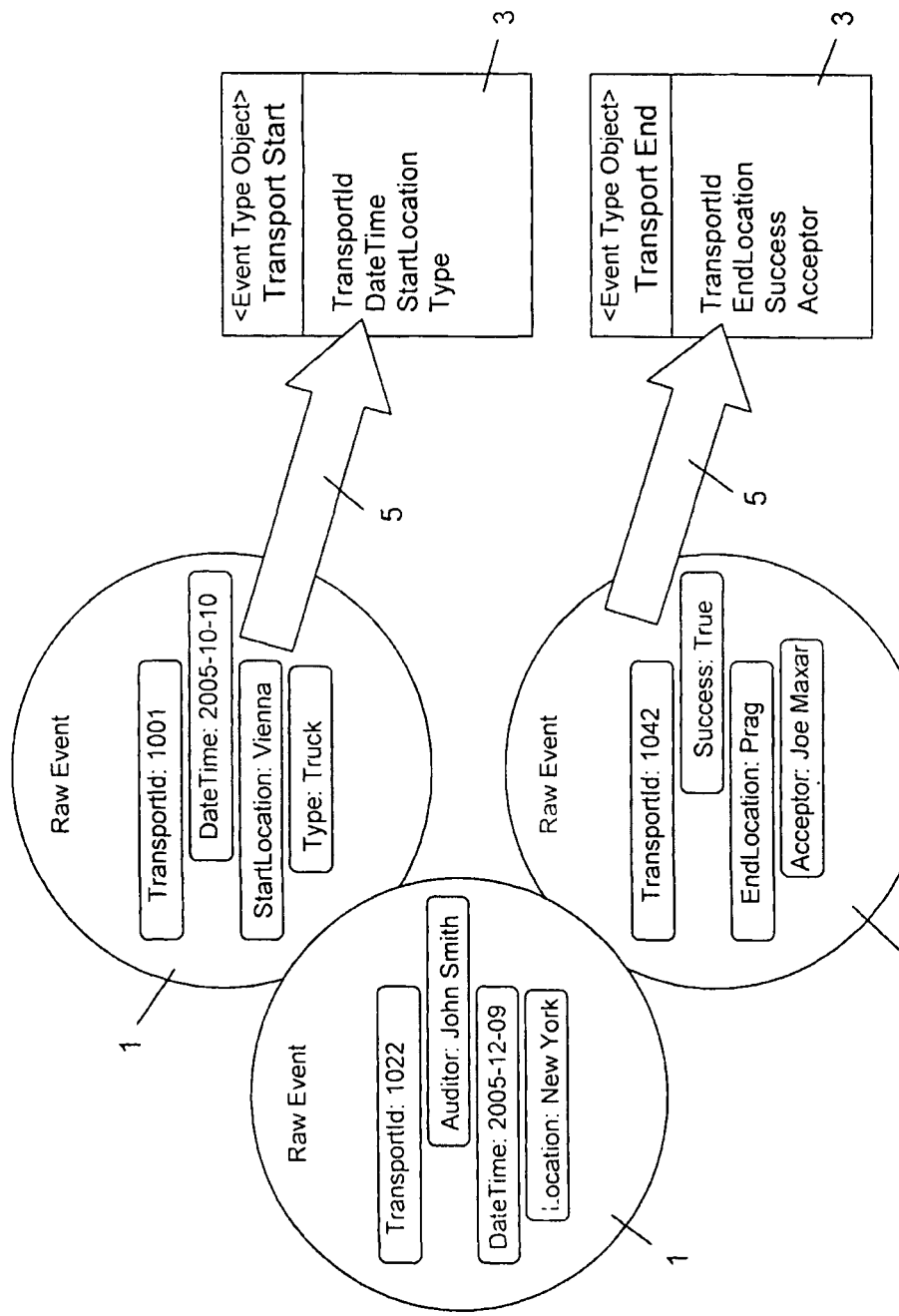
FIG. 2 shows an example of determining event type objects for several raw events.

FIG. 2 shows an example of a source set of three raw events 1 of data items 2. The source set might have been received by an adapter of an event-based system. In the example, two of the three raw events 1 have been successfully mapped to event type objects 3, i.e. a first event type object "Transport Start" and a second event type object "Transport End".

Figure 3:
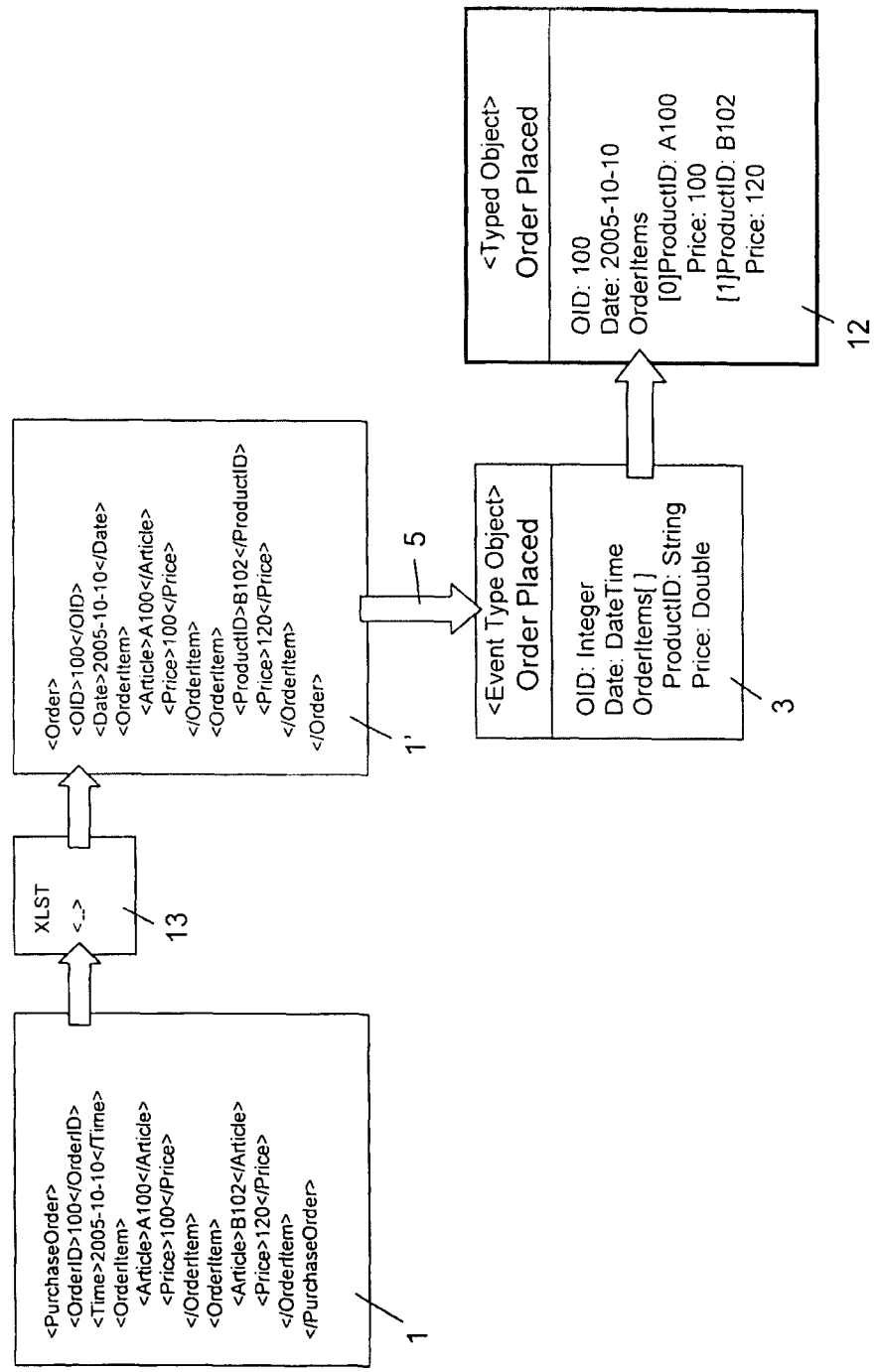
FIG. 3 shows an example of the method of the invention for generating a typed event from a raw event by means of the event type object determined.

FIG. 3 is a block diagram of the method of the invention showing the subsequent step of generating a typed event 12 from a raw event 1 by means of the event type object 3 determined. In this embodiment the raw event 1 is in the form of an XML message and is pre-processed by using an XML-Stylesheet (XSLT) 13 which changes the contents or structure of the XML message or re-structures data items 2 and/or data values 8 within the raw event 1. The pre-processed raw event 1' is then used for the step 5 of determining the fitting event type object 3 as disclosed with reference to FIGS. 1 and 2. Finally, a new "target" typed event 12 is generated which contains the data values 8 of the source raw event 1, now structured in the form of the event type object 3 determined. The newly generated typed event 12 can then be forwarded to further event processing in the event-based system.

If in the mapping step 5 no event type object 3 can be determined, i.e. searched and found in the library 4, which meets the applicable criteria mentioned above, optionally a "new" event type object 3 is generated from the raw event 1 and stored in the library 4. This means that at least the attributes 6 and data types 9 of such newly generated event type object 3 correspond to the data items 2 and data types 8 of the raw event 1; preferably also the attribute names 10 correspond to the data names 7 of the raw event. The library 4 supplemented by this new event type object 3 will then be used for mapping future raw events 1.

When mapping the data items 2 of the (optionally pre-processed) XML raw event 1 to the attributes 6 of the event type object 3 the check for matching data types can be performed by either investigating the data values 8 for suitability of a certain data type, i.e. by detecting the data types implicitly from their contents, or, if the raw event 1 conforms to an XML schema, explicit XML metadata can be used for this detection process.

Furthermore, in mapping the data items 2 of a raw event 1 to an event type object 3 a semantic knowledgebase can be used. If e.g. a data item 2 cannot be directly mapped to an attribute 6 of an event type object 3 because a data value 8 does not meet the constraint 11 of an attribute 6 of the event type object 3, a fuzzy match using a semantic knowledgebase of possible data values 8 and meeting constraints 11 can be performed. For instance, if an attribute 6 of an event type object 3 supports only the data values "truck", "car", "motorbike" (constraint 11) and the data value 8 of a data item 2 is "lorry" (the English word for truck), a semantic knowledgebase can be used to replace the data value 8 "lorry" with "truck" so that the raw event 1 becomes mappable to the event type object 3.

Similarly, a fuzzy match could also be made for matching data names 7 to attribute names 10 in the course of the above-mentioned criterion 5 using a semantic knowledgebase of possible data names 7 and matching attribute names 10.

In practice it is possible that several event type objects 3 can be found in the library 4 which meet all applicable criteria. In such a case, the method generates multiple typed events 12 corresponding to all different event type objects 3 determined for one and the same raw event 1.

It should be noted that the event type objects 3 need not necessarily be strict "objects" in the sense of object-oriented software engineering (although they might be) but could be formed by any other data entities, e.g. records in a database, lines or structures in a table, et cet.

The method of the invention can be implemented in and performed by an input adapter of an event-based system. Such adapters are able to connect to source systems and transmit event data when business events occur, typically via a messaging middleware. Thereby, event data is packaged into a message which is sent to the event-based system. The adapter of the event-based system listens to the messages sent by the source systems and forwards the message data as events to the internal event processing. In this context, the adapter processes a source set of raw events of different event types to a target set of typed events according to the method of the invention.

The invention is not restricted to the specific embodiments and examples disclosed herein but encompasses all variants and modifications thereof falling in the scope and spirit of the appended claims.

What is claimed is:

1. A method, implemented by a computing device, of processing a raw event of an unknown event type to a typed event, the raw event including data items that contain data values of detectable data types, the data items being structured according to a raw structure defining a first order of the data items, the method comprising:
   (a) accessing, by the computing device, a library that includes a plurality of event type objects, each event type object relating to a given event type and including attributes of given data types, the attributes included in each event type object being structured according to a predefined structure defining a second order of the attributes;
   (b) determining, by the computing device, at least one event type object for the raw event from the plurality of event type objects in the library, the at least one event type object being determined based on meeting following criteria without defined mapping of the data items of the raw event and the attributes of the at least one event type object, wherein the criteria comprise:
   a first criterion in which each data item included in the raw event maps to an attribute included in the at least one event type object, wherein the raw event includes a total number of mapped data items that is determined to equal a total number of attributes in the at least one event type object, and
   a second criterion in which a data value contained in each data item is of a data type detected to match the given data type of the mapped attribute; and
   (c) generating, by the computing device, at least one typed event from the raw event, the at least one typed event including the data values of the raw event restructured from the first order of the raw structure to the second order of the predefined structure of the determined at least one event type object.

2. The method of claim 1, wherein an event type object in the library is provided with at least one mandatory attribute and wherein in (b) a following third criterion must be met for the event type object in order to be determined:
   said at least one mandatory attribute of said event type object must be mapped by at least one data item of the raw event.

3. The method of claim 1, wherein an event type object in the library is provided with at least one data value constraint and wherein in (b) a following fourth criterion must be met for said event type object in order to be determined:
   said at least one data value constraint of said event type object must be met by a data value contained in a data item of the raw event.

4. The method of claim 3, wherein the meeting of the data value constraint is a fuzzy match using a semantic knowledgebase of possible data values and meeting constraints.

5. The method of claim 1, wherein each data item included in the raw event has a data name paired to its data value and each attribute included in said event type object has an attribute name and wherein in (b) a following fifth criterion must be met for the event type object in order to be determined:
   the data name of the paired data value included in each data item of the raw event must match the attribute name of the mapped attribute included in said event type object.

6. The method of claim 5, wherein the match is a fuzzy match using a semantic knowledgebase of possible data names and matching attribute names.

7. The method of claim 1, wherein in case multiple event type objects are determined for the raw event in (b), multiple typed events are generated from the raw event in (c).

8. The method of claim 1, wherein the raw event is a message in Extensible Markup Language (XML) format.

9. The method of claim 8, wherein the method further comprises preprocessing the raw event using an XML-Stylesheet.

10. The method of claim 1, wherein the method is performed by an input adapter of an event-based system.

11. A method, implemented by a computing device, of processing a raw event of an unknown event type to a typed event, the raw event including data items that contain data values of detectable data types, the data items being structured according to a raw structure defining a first order of the data items, the method comprising:
   (a) accessing, by the computing device, a library that includes a plurality of event type objects, each event type object relating to a given event type and including attributes of given data types, the attributes included in each event type object being structured according to a predefined structure defining a second order of the attributes;
   (b) searching, by the computing device, for at least one event type object for the raw event from the plurality of event type objects in the library, the at least one event type object being determined based on meeting following criteria without defined mapping of the data items of the raw event and the attributes of the at least one event type object, wherein the criteria comprise:
   a first criterion in which each data item included in the raw event maps to an attribute included in the at least one event type object, such that the raw event includes a total number of mapped data items that is determined to equal a total number of attributes in the at least one event type object, and a second criterion in which a data value contained in each data item is of a data type detected to match the given data type of the mapped attribute; and (c) if the at least one event type object is found for the raw event, generating, by the computing device, at least one typed event from the raw event to include the data values of the raw event re-structured from the first order of the raw structure to the second order of the predefined structure of the at least one event type object found, and, if no event type object is found for the raw event, generating, by the computing device, a new event type object that includes attributes and related data types which correspond to data items and related data types of the raw event.

12. The method of claim 11, wherein an event type object in the library is provided with at least one mandatory attribute and wherein in (b) a following third criterion must be met for the event type object in order to be found:

said at least one mandatory attribute of said event type object must be mapped by at least one data item of the raw event.

13. The method of claim 11, wherein an event type object in the library is provided with at least one data value constraint and wherein in (b) a following fourth criterion must be met for the event type object in order to be found:

said at least one data value constraint of said event type object must be met by a data value contained in a data item of the raw event.

14. The method of claim 13, wherein the meeting of the data value constraint is a fuzzy match using a semantic knowledgebase of possible data values and meeting constraints.

15. The method of claim 11, wherein each data item included in a raw event has a data name paired to its data value and each attribute included in an event type object has an attribute name and wherein in (b) a following fifth criterion must be met for the event type object in order to be found:

the data name of the paired data value included in each data item of the raw event must match the attribute name of the mapped included in said event type object; and wherein in (c), if the event type object is not found, said new event type object is generated with attribute names corresponding to data names of the raw event.

16. The method of claim 15, wherein the match is a fuzzy match using a semantic knowledgebase of possible data names and matching attribute names.

17. The method of claim 11, wherein in case multiple event type objects are found for the raw event in (b), multiple typed events are generated from the raw event in (c).

18. The method of claim 11, wherein the raw the raw event is a message in Extensible Markup Language (XML) format.

19. The method of claim 18, wherein the method further comprises preprocessing the raw event using an XML-Stylesheet.

20. The method of claim 11, wherein the method is performed by an input adapter of an event-based system.

* * * * *